W. M. WHITNEY.
CUTTER HEAD.
APPLICATION FILED APR. 7, 1920.
1,363,192.
Patented Dec. 21, 1920.
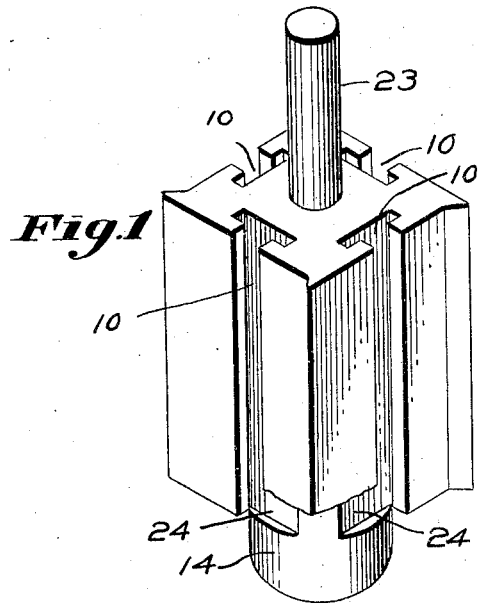
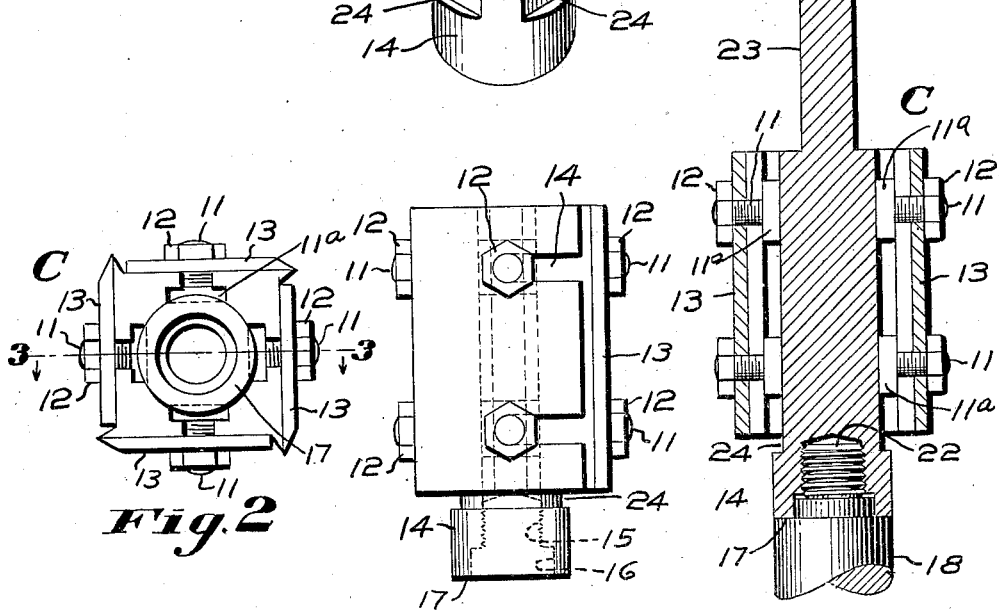
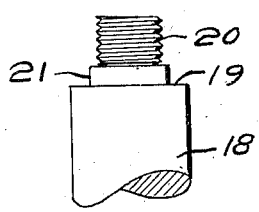
Inventor:
William M. Whitney
by Robt. D. Haines,
Attorney

UNITED STATES PATENT OFFICE.

WILLIAM M. WHITNEY, OF WINCHENDON, MASSACHUSETTS, ASSIGNOR TO BAXTER D. WHITNEY & SON, INC., OF WINCHENDON, MASSACHUSETTS, A CORPORATION OF MASSACHUSETTS.

CUTTER-HEAD.

1,363,192.  Specification of Letters Patent.  Patented Dec. 21, 1920.

Application filed April 7, 1920. Serial No. 371,824.

*To all whom it may concern:*

Be it known that I, WILLIAM M. WHITNEY, a citizen of the United States, residing at Winchendon, in the county of Worcester and State of Massachusetts, have invented an Improvement in Cutter-Heads, of which the following description, in connection with the accompanying drawings, is a specification, like characters on the drawings representing like parts.

This invention relates to means for removably securing a cutter head to a driving spindle, and more particularly to means for securing a wood-working cutter head provided with adjustable blades to a driving spindle.

Heretofore it has been customary to provide woodworking machines with cutter heads having a relatively large bore extending longitudinally therethrough to receive the driving spindle of the machine. These cutter heads, in addition to the longitudinally-extending bore just mentioned, are also commonly provided with longitudinally-extending T-shaped slots formed in each face of the cutter head to slidably receive the heads of bolts provided to secure the cutter blades in place. This manner of securing a cutter head to its driving spindle is open to the objection that in forming the central bore and longitudinally-extending slots, the metal of which the head is constructed is cut away to such an extent that the head is seriously weakened and is likely to break during ordinary use, due to this weakened condition. The cutter heads should be removably and not permanently secured to the driving spindle in order that different cutter heads may be used upon a spindle.

The primary object of the invention, therefore, is to provide means for removably securing a cutter head to its driving spindle, which will not necessitate the cutting-away of the interior of the cutter head.

A more specific object of the present invention is to provide a cutter head with an integral boss formed at one end thereof, and to so construct this boss that it may be firmly but removably secured to the driving spindle of a shaper or other form of cutting machine.

The character of the invention will be best understood by reference to the following description of one good form thereof shown in the accompanying drawing, wherein:—

Figure 1 is a perspective view of a cutter head showing the supporting boss formed upon one end thereof, the cutter blades being omitted;

Fig. 2 is a plan view of the lower end of the cutter head shown in Fig. 1;

Fig. 3 is a vertical sectional view taken on the line 3—3 of Fig. 2, and showing the cutter head secured to its driving spindle;

Fig. 4 is a side view of a slightly modified form of cutter head; and

Fig. 5 is a side view of the upper end of a driving spindle for the cutter head.

In the embodiment of the invention illustrated in the drawing, a cutter head, which is designated in its entirety by the letter C, is shown as substantially square in cross section, and each of the four lateral faces of this cutter head is shown as provided with a T-slot 10 extending longitudinally from one end of the cutter head to the other. These T-slots are adapted to slidably receive the heads 11$^a$ of the blade securing bolts 11, the outer ends of which are threaded and are adapted to receive correspondingly threaded nuts 12. These bolts and coöperating nuts serve to clamp the cutter blades 13 in place against the lateral faces of the cutter head; and in order that these blades may be adjusted laterally, the bolt-receiving slots 14 may be formed therein. The construction of the cutter head so far described is old and well known, and forms no part of the present invention.

As above stated, this invention relates to means for removably but rigidly securing a cutter head upon a driving spindle without the necessity of forming a bore centrally through the cutter head, and in carrying out this object of the invention, the cutter head illustrated is shown as provided upon one end thereof with an integral boss 14 extending in an axial direction. This boss is preferably provided with a threaded socket 15 formed centrally therein and extending upward within the boss to approximately the point where the boss joins onto the cutter head. The threaded portion of this socket 15 preferably terminates a short distance from the outer end of the boss 14, and a smooth, annular wall or recess 16 having a diameter greater than that of the threaded socket is formed between the outer end of the boss and the threaded portion of the socket 15. The lower end of the boss 14 is provided with a flat face 17 as shown in Figs. 3 and 4, for a purpose hereinafter pointed out.

The boss 14 just described, is constructed to removably fasten the cutter head to the upper end of a driving spindle 18, and this spindle preferably has formed at its upper end a flat seating shoulder 19, and from this end of the spindle an axially-extending threaded stud 20 is provided. In addition to this threaded stud 20, a centering neck 21 having a diameter greater than that of the threaded stud is preferably formed between the base of this stud and the shoulder 19 of the spindle. The construction of the upper end of the driving spindle is such that the cutter head may be rigidly secured to the same by screwing the threaded end of this spindle into the threaded socket 15 of the boss 14 formed integral with the cutter head, and the parts just described are so constructed that when the threaded stud is screwed tightly into the threaded socket, the lower flat face 17 of the boss 14 will rest firmly upon the seating shoulder 19 of the driving spindle. The threaded stud 20 is preferably not long enough to abut against the bottom of the threaded socket 15. This is desirable in order that a clearance space such as indicated by 22 will always exist between the outer end of the stud and the bottom of the socket in which it is screwed. Likewise, the centering neck 21 should not be long enough to reach the bottom of the annular centering recess 16, for the parts should be so arranged that when the cutter head is screwed "home" upon the driving spindle, the lower face 17 of the stud 14 will firmly rest upon the seating shoulder 19 and will not be held out of this seating position by either the centering neck 21 or the end of the threaded stud 20. The diameter of the centering neck 21 should be such that the same fits snugly into the annular centering recess 16 in order that this centering neck will serve to accurately center the cutter head upon its driving spindle.

When it is desirable to use a cutter head of the type herein illustrated, to do heavy work, it is often necessary or advisable to provide means for steadying the upper end of the cutter head; and for this purpose, as is well known, an overhead steady bearing is commonly provided. In order that this steady bearing may be used with the type of cutter head herein shown, the cutter heads of Figs. 1 and 3 are illustrated as provided with an upwardly-projecting bearing spindle 23, and this spindle is constructed to rotate in the steady bearing in a well known manner.

Since it is desirable to screw the cutter head into rigid engagement with the driving spindle, the device illustrated is shown as provided with diametrically opposite flattened faces formed in opposite sides of the boss 14 adjacent the lower face of the cutter head, as indicated at 24, Figs. 1, 3 and 4; and these flattened faces are adapted to be engaged by a wrench when it is desired to screw the cutter head in place upon the driving spindle or to remove the same therefrom. These flattened faces 24, it will be noted, also serve as clearance spaces for the heads 11a of the bolts 11, should it be desirable to position these bolts within the slots 10 down close to the lower end of the cutter head.

The modified construction shown in Fig. 4 differs from the cutter head shown in Figs. 1 and 3 only in that the centering spindle 23 illustrated in the two figures just mentioned, has been omitted from the cutter head in Fig. 4.

From the foregoing description when read in connection with the drawing, it will be seen that a very satisfactory means has been provided for removably securing a cutter head to the driving spindle of a shaper or other form of cutting machine; and it will also be seen that by the construction herein disclosed, the need of forming a relatively large bore through the cutter head is avoided, and as a result, a very much stronger and more satisfactory cutter head is obtained.

What is claimed is:—

1. A cutter head which is formed of a solid block and has knife-securing and adjusting slots, a bearing spindle extending axially from one end of said block, a longitudinally extending boss formed integral with the block at the other end thereof, said boss having a bore of no greater depth than the extension of the boss from the block, a screw thread formed on the interior of the boss and terminating adjacent the outer end of the boss with a centering wall of greater diameter than the threaded portion of the boss, a spindle having a stud extending longitudinally thereof and threaded to engage the interior threads on the hollow boss, a centering neck which is formed at the base of the stud to engage the centering wall of the boss, and a shoulder formed on the end of the spindle and of greater diameter than the centering neck upon which the end of the boss is adapted to bear when the parts are in assembled relation.

2. A cutter head which is formed of a solid block and has knife securing and adjusting slots, knives secured to said block, a boss extending axially from one end of said block and formed integral therewith, said boss having a socket formed centrally therein, a screw thread formed within said socket and terminating adjacent the outer end of the boss with a smooth centering wall of greater diameter than the threaded portion of the socket, a spindle having a stud extending longitudinally thereof and threaded to engage the threaded socket, a centering neck which is formed upon the spindle at the base of the stud to engage the centering wall, a seating shoulder formed at the end of the spindle positioned to have the end of said boss held firmly seated thereupon by the interengaging threads, and flattened wrench engaging surfaces formed upon the opposite walls of the boss between the knives and the spindle-engaging end of the boss.

3. A cutter head which is formed of a solid block and has knife-securing and adjusting slots extending longitudinally thereof, longitudinally-extending knives secured to the lateral face of the cutter head, a longitudinally-extending boss formed integral with and projecting from an end of the block, said boss having a threaded socket formed centrally therein and having a smooth centering wall of greater diameter than the threaded portion and positioned between the threaded portion and the outer end of the boss, a spindle having a stud extending from an end thereof and threaded to engage the interior threads of the hollow boss, a centering neck which is formed at the base of the stud to engage the centering wall of the boss, and a shoulder formed on the end of the spindle and positioned to have the outer end of the boss firmly seated thereupon when the parts are in assembled relation.

In testimony whereof, I have signed my name to this specification.

WILLIAM M. WHITNEY.